March 4, 1930. T. WILFRED 1,749,011
LIGHT PROJECTION DISPLAY
Filed Aug. 30, 1924  3 Sheets-Sheet 2
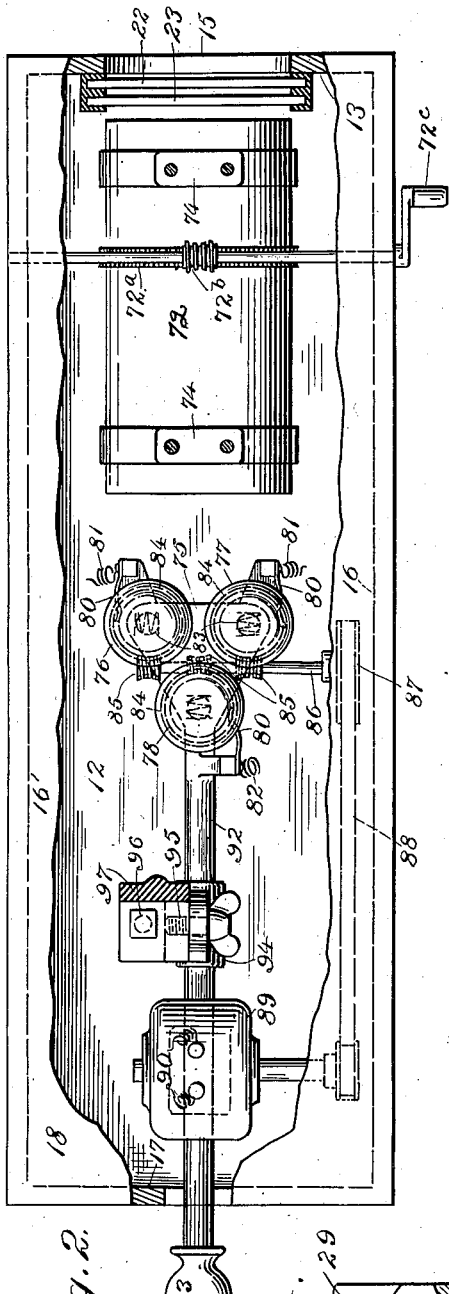
INVENTOR:
Thomas Wilfred,
BY Rogers, Kennedy & Campbell,
ATTORNEYS.

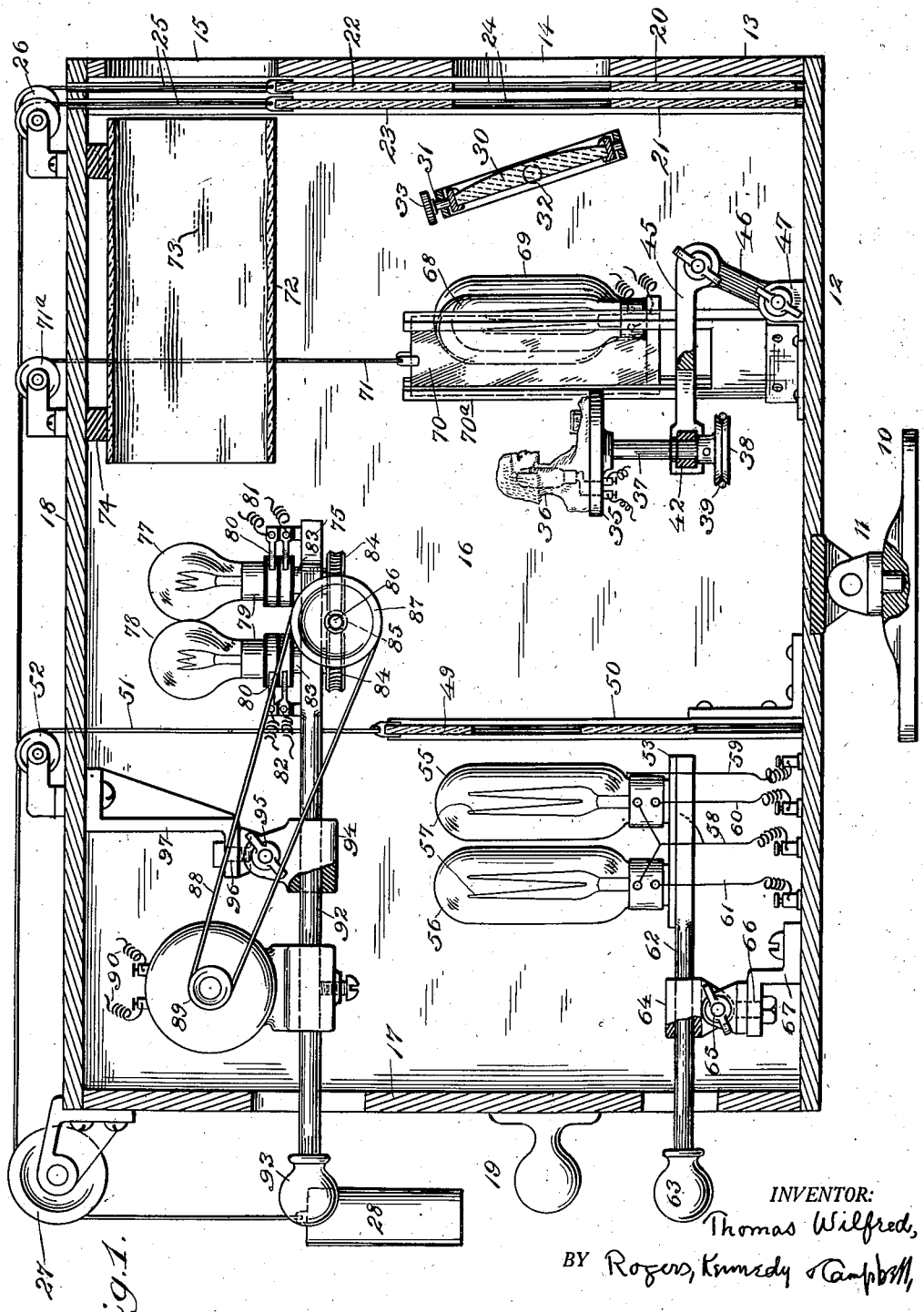

Patented Mar. 4, 1930

1,749,011

UNITED STATES PATENT OFFICE

THOMAS WILFRED, OF HUNTINGTON, NEW YORK

LIGHT-PROJECTION DISPLAY

Application filed August 30, 1924. Serial No. 735,168.

This invention relates to the art of light projection display for example the projection of effects in light or color upon a curtain, for exhibition. A novel method or system is involved and also a novel apparatus or machine for carrying out the same. The utility of the invention is broad as it may be used not only for entertainment but for interpretive purposes, for psychical study, for treatment of the mind or eye, and other uses.

The main object of the present invention is to enable the projection upon a suitable curtain or other background of effects in lights and shadows, or colors, adapted to please the mind or stir the imagination or emotions, and with the production of extensive variations in tone, pattern, motion and evolution of effect. A particular object of the present invention is to afford new and interesting types of projected effects. The further and more detailed objects and advantages of the present invention will be elucidated in the hereinafter following description or will be apparent to those conversant with the subject.

To the attainment of the objects and advantages referred to, the present invention consists in the novel art, system or method and the novel apparatus or machine herein described or illustrated, as well as the novel features of combination, arrangement, operation, construction and detail.

In the accompanying drawings Fig. 1 is a right hand elevation of an apparatus illustrating the present invention, with the right hand wall broken away or sectioned to show more fully the interior mechanism. What I term the forward side of the machine is at the right hand of Fig. 1, this side being provided with the aperture which is directed toward the curtain, and the operator or performer stands at the rear or left side of Fig. 1.

Fig. 2 is a plan view of the apparatus, with the top wall broken away to show the interior, but with all the parts in the lower half of the apparatus omitted.

Fig. 3 is a view similar to Fig. 2, but with all the parts in the upper half of the apparatus omitted.

Fig. 4 shows a modified color screen.

Figure 5:
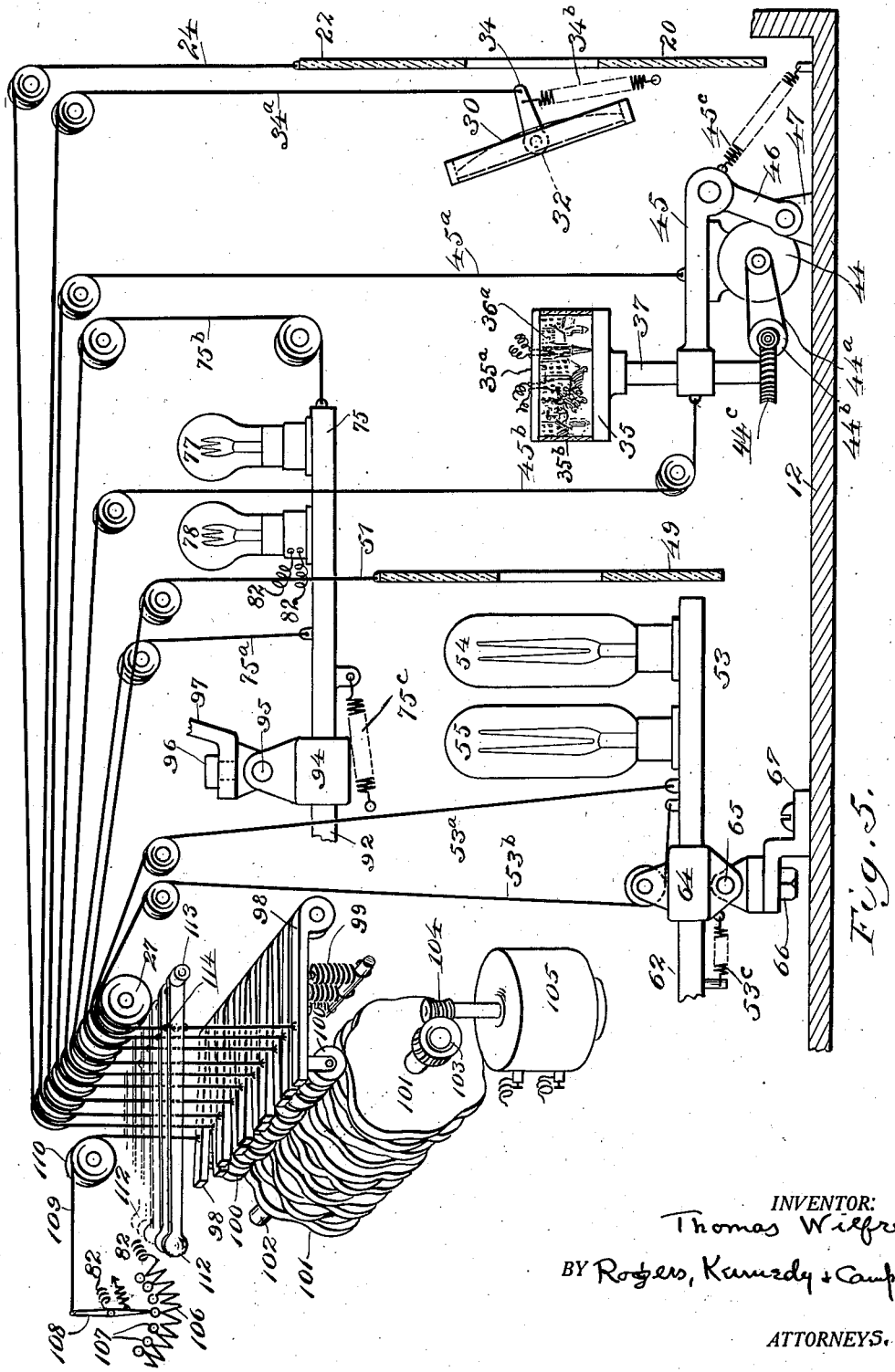
Fig. 5 is a diagram showing coordinated or automatic timing and operation.

A base plate 10 is shown, which may be attached upon any support, and by a universal joint 11 the box or casing of this invention is supported, in a manner so that it can be tilted longitudinally or swung to right and left. The box or casing constitutes the frame of the apparatus, giving support to the interior parts, and it is shown consisting of a bottom wall or floor 12, a front wall 13 having a lower optical opening 14 and an upper optical opening 15, opposite side walls 16, a rear wall 17 and a top wall 18. A handle or knob 19 may be provided, for example on the rear wall, for the purpose of swinging or tilting the apparatus as a whole.

In order that the projected light may be colored a system of color screens adjacent to the optical openings 14 and 15 is provided, the same movable vertically into and out of projecting position. For purposes of illustration there are shown a lower color screen 20 and to the rear of that a second lower screen 21, also upper color screens front and rear 22 and 23. These screens may be suitably guided in their shifting movements and operated by connectors or cords 24 for the lower screens and 25 for the upper screens, the cords all passing over a series of pulleys 26 mounted at the front of the top wall 18. The operation of the lower screens may be independent of the upper ones, through wholly separate cords, or the cords 24 may simply connect the lower screens to the upper ones so that they will move in unison. In either case the optical opening 14 may be partly or wholly covered by a lower screen or an upper screen or both. For example, the upper front color screen 22 might be of red color and dropped a third way down over the optical opening, and the lower rear screen 21 of a blue color lifted a third way up into the optical opening. thus giving a red, white and blue projection. The several cords passing around the several pulleys 26 may all extend to the rear and there pass around a series of pulleys 27 and downwardly into a series of counterweights 28, one for each cord. The screens may be manipulated by lifting and lowering the counterweights or otherwise moving the cords.

To the rear of the lower optical opening 14 is shown a lens 30, which may be of various types, and for convenience is shown as a plano-convex lens, which is adapted to be set obliquely, at an adjustable slant, for the purpose of altering or distorting the projection and thus giving characteristic effects on the curtain. The lens is shown mounted to turn about a vertical axle 31 and a horizontal axle 32, with a knob 33 on the former and a handle 34 on the latter, permitting ready adjustment of the lens in any manner desired.

One feature of improvement in the present invention is the interposing of an object in the path of the light rays, adapted to cast a shadow in respect to illumination from the rear, or to project its own image through illumination from the front, or both; rendering possible many unique and weird figures of projection. For such purposes a platform 35 may be employed on which an object 36 may be positioned in the path of the light rays, and to the rear of the lens 30. There is no limit to the character of object that may be placed upon the platform 35. It may be a still figure, an animated object, or even a live object. It may be opaque or translucent, or even luminous; or a combination of these. Specific objects that may be used to advantage are the following: a flower, a piece of mechanism or clockwork, still or in motion, a statuette, such as the sphinx which is indicated in the drawings, or a luminous article or tube formed or bent to any desired shape, the sphinx being shown as containing a lamp, which may be illuminated or extinguished. It is proposed to move bodily the platform and object during the projection and suitable means for giving universal movement thereto may be as follows. The platform 35 is mounted on a vertical shaft 37 which has a pulley 38 at its lower end engaged by a belt 39 which extends through an aperture in the right hand wall 16 to an exterior pulley 40, the shaft of which is provided with a knob 41 which may be manipulated to rotate the platform as desired. The elements 37 to 41 are mounted on a cross bar 42 which is provided with a knob 43 at its exterior end by which the operator may bodily lift or lower the platform, or shift it toward left or right. This shifting movement is permitted by reason of the cross bar 42 being arranged slidingly in the two arms of a yoke lever 45, this lever extending forwardly and being pivotally connected to a link 46, the lower end of which is mounted on a lug 47 on the bottom wall of the apparatus. The various movements of the object 36 are reproduced on the curtain. The elements 45 and 46 permit front and back motion, changing the condition of focus.

It may be desirable to silhouette the object 36 through colored illumination from the rear, and for this purpose a color screen device 49 is shown, analogous to the color screens at the front, with guides 50 therefor, and a cord 51 passing over a pulley 52 at the top and extending to a counterweight 28, to enable control at will.

The main projecting lamps for the described system may be enclosed in the rear portion of the casing. A lamp support or carriage 53 is shown supporting three lamps, two front lamps 54 and 55 and a rear lamp 56, symmetrically arranged. The lamps are preferably incandescent filamentary lamps, and the filaments 57 may be of any desired configuration, it being possible with this invention to project images of the filaments upon the curtain through the lens 30, these images undergoing various movements and evolutions during the performance, and the lamps may be arranged to be rotated during the performance. Electric current may be communicated to the three lamps by the four wires 58, 59, 60 and 61, controlled by suitable switches, so that any one or more or all of the lamps may be illuminated; and rheostats may be provided in each circuit to permit the gradual dimming or strengthening of the illumination from each lamp.

The lamp platform 53 is shown supported at the forward end of a rod 62 which is universally mounted so as to permit universal manipulation of the lamps, through a knob 63 at the exterior end of the rod. The rod may rotate and slide within a bearing or slideway 64, which may tilt about a horizontal axle 65 and swivel about a vertical axle 66, these parts carried on a base lug 67.

The apparatus thus far described is capable of projecting extremely interesting and curious effects, even with the still object illustrated or a similar one such as a vase or a crystal, and with a small bit of machinery such as the works of a clock very weird effects can be made to loom up on the curtain. The object 36 may be replaced by a vacuum tube illuminated by high frequency electricity, this both throwing a shadow, and throwing illumination of its own particular color, depending on the character of the gases present in small quantities in the tube. Very interesting and useful effects in the projection of stage scenery can be effected, the instrument located either in front of or behind the curtain on which the projection is made; for example a landscape can be projected, to form the background of a stage setting, and the background of the landscape may consist of light from the rear of the apparatus, which may be changed in hue and intensity to represent natural changes during the day or seasons, while the projected scenery itself can be brightened or darkened to correspond.

When an opaque or non-luminous object is interposed in the path of the light rays this may be caused to project its own image in natural colors by illumination from the front, or rather at an incline. For this purpose a pair of lamps 68 is shown combined with reflectors 69, arranged to illuminate strongly the front and sides of the object. These lamps are set at a diagonal position, and either or both may be illuminated, dimmed or extinguished, through separate electric connections, so that the effect of light and shadow, and relief may be universally altered at will. When a white light is so projected on the object it will project itself in natural colors upon the curtain, and its details of form and color will appear. The effect may be varied by coloring the illumination of the object and for this purpose each lamp is shown provided with a color screen 70 which may slide up and down in guides 70ª through cords 71, passing over pulleys 71ª at the top, controlled by counterweights 28. It will be understood that the lens 30 can be set in true position for normal projection of the image, or slanted at will to give effects of distortion. As already suggested the object 36 may have front illumination for the purpose of projecting its own image, in white or in colors, such image to be surrounded by a field or background projected from the rear lamps 54, 55, 56, the filaments of which may produce striking effects of form and motion covering the curtain, with the image of the object superposed in the middle of the field, in white or in color, and with any desired changes of illumination and position. In effect one is enabled to project a silhouette which itself discloses details of color and form. The revolving of an object on the platform 35 is found to give a most realistic effect of depth, which is more or less lost when the object is stationary. This projection itself is of great interest, and is the more interesting with the accompaniment of the rear lamp filament projection as described.

The projecting means in the upper part of the casing may be used alone if desired, but in conjunction with the arrangements in the lower part of the casing combined effects are producible, which are much more than the sum of the two effects. Various degrees of light, with various shades and hues of color, thrown upon the curtain in a manner to overlap partially, give additive effects which are sometimes extremely surprising and beautiful; and an artist skilled in the practice of the invention can compose harmonious combinations or performances, which can be recorded and repeated at will. Indeed the different elements of the present invention may be controlled by a systematic means, such as a keyboard, rather than the detached control means employed in the drawings for purposes of illustration. The various lamps and the various motions of the various moving parts can all be connected with a controlling key-board, enabling written notation to be made for the guidance of the operator in repeating performances; and if found desirable automatic control by a preforated control sheet or other record would be available.

The characteristic thing about the projecting means in the upper part of the illustrated apparatus is what may be termed the internal reflector, or reflecting tube 72, located behind the upper optical opening 15 in the front wall of the apparatus. This tube may be of various forms, cylindrical, conical, polygonal, or any other arrangement of reflecting surfaces facing inwardly and surrounding the path of projection. A cylindrical tube 72 is shown, and it reflects and directs to the curtain the filamentary illumination from the rear, without the need of a projecting lens. The tube may consist of internally polished metal, silvered glass or the like and means may be provided for maintaining it in rotary or tilting motion during the performance. Instead of a regular surface the tube 72 may be formed with rifling or corrugations or other irregularities such as the slight protuberances 73 illustrated. The tubular reflector 72 is shown held in place by clamping means 74.

On a supporting block 75 are mounted two front lamps 76, 77 and a rear lamp 78, these being filamentary lamps, in line with the axis of the projecting tube 73. Each lamp may be mounted in a rotatable socket 79 having a commutator device 80 for delivering current thereto. Conducting wires 81 supply current to the front lamps and wires 82 to the rear lamp. Each socket is formed with a short axle 83 passing through the support 75, and each axle may have a worm wheel 84, all of which are driven from worms 85 on a shaft 86, so that by revolving the shaft the lamps are maintained in rotation during the performance. It will be understood that each lamp may have its own switch and rheostat for the purpose of complete control of illumination. Each filament projects its own image, which is highly multiplied by the reflecting tube, giving geometrical effects, which may be distorted by the irregularities in the tube.

The action of any of the movable devices may be performed automatically or by power. For example the rotation of the lamps 76, 77 and 78 may be effected as follows. The worm shaft 86 is provided with a pulley 87 connected by a belt 88 with an electric motor 89 supplied with current by wires 90 with which may be associated a switch and a rheostat to control action and speed.

The described elements 75 to 90 may be supported upon a carrying rod 92 which has an exterior knob 93 for manual control. The rod may slide forwardly and rearwardly in a slideway 94, and may rotate therein, imparting corresponding movements to the lamps. The slideway 94 is shown as tiltable about a horizontal axle 95 and swingable about a vertical axle 96, all carried by a bracket 97 standing downwardly from the top wall. The three lamps thereby may be given universal bodily movements in addition to their rotation during projection.

The light projected through the tube 72 may be colored by interposing one of the screens 22 or 23, which may be of different colors.

It was above stated that the cylindrical reflector 72 could be kept in motion during the performance, and for this purpose is shown a gear $72^a$ surrounding the cylinder, engaged by a worm $72^b$, the shaft of which is provided with an external handle $72^c$, that can be turned to give slow rotation to the mirror, by hand or power, steadily or intermittently.

The platform 35 carrying the object 36 is shown rotatable by hand in Figs. 1 and 3; but such rotation may be by motor, and Fig. 5 shows a motor 44 adapted for this purpose, being connected by a belt $44^a$ with a worm $44^b$ turning a gear or worm wheel $44^c$ on the upright spindle or shaft 37 of the platform.

The various screens 20—24, 49, 50, and 70, may be plain color screens or may be patterned screens having designs of various sorts such as stripes, or irregular designs, for example of the character shown at 29 in Fig. 4, such screens introducing weird variations in the performance.

It was stated that the various elements could be actuated automatically, and this can be done with any desired coordination, for example by a control means such as a perforated sheet record, system of cams, or the like. A convenient way to convey automatic movement to the different elements is through cords such as the cords 24 and 51 already mentioned. The diagram Fig. 5 shows one manner in which the variations may be coordinated in an automatic manner. The counterweights 28 shown in Fig. 1 are omitted in Fig. 5 and replaced by a system of horizontal levers 98, to which the various cords are attached. These levers are pulled down by strong springs 99. Each lever has a cam roller 100 at its free end, and the several rollers ride upon cams 101 mounted on a cam shaft 102. This system of cams may be considered as constituting the playing record of a given performance, and the same may be replaced by a substitute system at will. The cam shaft 102 is shown having a worm wheel 103 at one end, engaged by a worm 104 on the shaft of a driving motor 105, which thereby gives slow rotation to the cams. The cams acting through the cam rollers and levers operate to let out or draw down the various cords extending to the different movable elements.

It has been stated that various operations or illuminations may be controlled by rheostats and the diagram shows such a rheostat consisting of a resistance coil 106, the contacts 107 of which are contacted by a swinging arm 108 connected by a cord 109 passing over a pulley 110 to one of the levers 98.

It may be desirable sometimes to modify the cam action and for this purpose a series of hand levers 112 may be employed, located above the cam levers 98. The levers 112 are fulcrumed at 113 and are attached at points 114 to the various cords, so that the performer may readily either elevate or depress any lever 112 to modify correspondingly the movement of the connected element. The bank of levers 112 constitutes substantially a keyboard.

Various of the elements already described may be controlled by the cam mechanism, for example the following. The color screens 20, 22, et cetera, connected by cords 24 to levers 98, are automatically lifted and lowered by the corresponding cams. The lens 30, through its handle 34, may be slowly tilted during a performance, namely by cord $34^a$, a spring $34^b$ pulling oppositely on the handle, in opposition to the pull on the cord. The platform 35 may be lifted and lowered through the cord $45^a$ similarly connected and operated. The platform 35 may be moved forwardly or rearwardly through cord $45^b$, opposed by spring $45^c$. The color screen 49, connected by its cord 51, may be moved automatically, as already described. The lamp platform 53 may be lifted and lowered by cord $53^a$. The lamp platform may be moved rearwardly by cord $53^b$, and returned forwardly by spring $53^c$. The lamp platform 75 may be lifted and lowered by cord $75^a$ and may be moved forwardly by cord $75^b$, opposed by spring $75^c$.

Any of the lamps may be illuminated or dimmed in coordination with the other movements; for example the conducting wires 82 of lamp 78 may extend to rheostat 106—108, for automatic regulation.

It will be understood that Fig. 5 is only diagrammatic; and illustrates the principles of automatic coordination of movements. It is not endeavored to illustrate the cams 101 with the exact or preferred contours that would be used in practise, as indeed it would be preferred in the case of many of the described connections to give the elements a greater throw or movement than is actually provided in the form shown in the diagram. It will be understood that where an extended movement is desired, for example to lift or drop one of the color screens the full distance permitted, a mechanical departure from the diagrammatic illustration could readily be made, either by redesigning the cam or by introducing special pulleys, levers, or other mechanism to multiply the delivered motion.

The silhouetted object 36 is shown in Fig. 1 as a figure resting on the platform 35 to the rear of the distorting lens 30 and with the filamentary lamps 55, 56, 57 to the rear, and appropriate color screens interposed in the path of the light, the object having practically universal movability, including rotation. There is no limitation to the nature of the object that may be placed on the platform 35. With a lens such as illustrated, there will be distortion when the lens is tilted as shown, although the distortion can be eliminated by righting the lens; and the projected image will be inverted unless supplemental inverting reflectors are provided. In Fig. 1 therefore it will be understood that the figure 36 will be projected in an inverted position, unless it is inverted on the platform 35, or unless inverting means are employed. The simplest plan would be to invert the object on the platform, as illustrated by the object 36ᵃ in the diagram Fig. 5. This object represents an outdoor scene such as a village, which is preferably not a mere pictorial representation, but an actual miniature village in three dimensions. This is shown mounted at the underside of an inverted support 35ᵃ which in turn is carried above the support 35 by a transparent support or wall 35ᵇ. Being inverted this object is projected on the screen in natural position, and when the lens is in its correct position the village is thrown on the curtain in silhouette. Under these conditions the gradual rotation or other progressive movement of the object will cause progressive changes on the curtain with very interesting and realistic effect. Thus when used as a stage scene, a group of persons can be arranged to walk apparently in one direction, while the village scenery on the curtain can be operated to move in the other direction, thus fully carrying out the illusion.

The effect with this or other objects is greatly enhanced by having the object not merely silhouetted but illuminated. This refers both to exterior illumination, for example by the lamps 68 and color screen 70, already mentioned, and to interior illumination as indicated by the electric lamp and wiring, which in the case of the village may represent illuminated windows. The scene thrown on the curtain can be gradually changed from a representation of the village in the dark of a night, through the varying changes representing dawn, sunrise and full daylight. The rear lamps 54 and 55 throw the illumination representing the sky, which can be gradually changed from dull tones and colors through the colors representing dawn and sunrise, the village itself being at first a pure silhouette but being gradually illuminated from the front so as to bring out the colors and details of the houses and other portions of the scene; the interior illumination being maintained until terminated after dawn to represent the extinguishing of lamps within the house. Manifestly the effects can be varied greatly within the principles described and the objects shown in the drawings are merely instances representative of the principles employed.

It will thus be seen that I have described an art or method or light projection display and apparatus therefor embodying the principles and attaining the purposes of the present invention. Since many matters of method, operation, effect, arrangement, combination and detail may be variously modified without departing from the inventive principles it is not intended to limit the invention to such matters except so far as specified in the appended claims.

What is claimed is:

1. The art of light projection display comprising throwing changing forms upon a curtain through a lens from a moving filamentary source of light arranged to cast images of its own filaments by progressively moving such source of light relatively to the axis of projection, and varying the effect by interposing in the light path between the light source and lens a relatively movable three dimension object and bodily rotating the object in the light path during projection about an axis transverse to the axis of projection to superpose a changing silhouette upon the projected light.

2. The art of light projection display comprising projecting light from a glowing filament through a lens upon a curtain and representing by shadow a moving scene by interposing in the light path between the filament and lens a miniature scene in three dimensions and progressively moving the same during projection by rotation about an upright axis in the light path.

3. Light projection display apparatus comprising a front projecting lens, a filamentary source of light to the rear of the lens, and a three dimension object interposed in the light path between the light source and lens adapted to throw a shadow on a curtain, said object having means for progressively bodily rotating it in the light path during projection, and a second source of light arranged to illuminate the front of the object to cast a reflected image thereof.

4. Light projection display apparatus comprising a projecting lens, a rear source of light, and an object interposed in the light path adapted to throw a shadow on a curtain, said object being a scene in three dimensions, with means for progressively rotating it in the light path during projection to produce the effect of three dimensions in the projected shadow, and a second source of light arranged to illuminate the front of the scene to cast a reflected image thereof.

5. Light projection display apparatus comprising a front projecting lens, a source of light to the rear of the lens, and means for holding in the light path between the light source and lens a three dimension object to be silhouetted on a curtain, said holder being rotatable about an axis extending through the object and transverse to the light path, and means causing predetermined rotation of the holder and object in the light path during projection.

6. The art of light projection display comprising projecting upon a curtain through a lens a beam of light and interposing a three dimension object in the light path between the lens and light source to cast its shadow while at the same time independently illuminating the object to develop reflected details of the object on the projected shadow, and rotating it in the light path to develop depth of projection.

7. The art of light projection display comprising throwing upon a curtain a beam of light and interposing a three dimension object in the light path to cast its shadow while at the same time illuminating the object to develop details of the object on the projected shadow and rotating it in the light path to develop depth of projection; the illumination of the object being by light thrown upon the front of the object to be reflected to the curtain, said light being of a different color from the beam of light thrown upon the curtain.

8. The art of light projection display comprising projecting upon a curtain through a lens a beam of light and interposing an object in the light path behind the lens to cast its shadow while at the same time independently illuminating the object to develop details of the object on the projected shadow, namely by maintaining within the object an interior source of light separate from the beam of light projected upon the curtain, and the object having light transmitting walls.

9. The art of light projection display comprising projecting upon a curtain through a lens a beam of light and interposing a scene in the light path behind the lens to cast its shadow while at the same time independently illuminating the scene to develop reflected details of the scene on the projected shadow, while the projected light represents sky or background.

10. Light projection display apparatus comprising a front lens, a filamentary source of light to the rear of the lens, means for holding a three dimensional object in the light path between the light source and lens to throw its shadow, means for rotating the holding means about an axis crossing the light path between the light source and lens, means for simultaneously illuminating the front of the rotating object, and means for cooperatively operating the rotating means and progressively moving the light source during projection.

11. Light projection display apparatus comprising a front lens, a source of light to the rear of the lens, means for holding a three dimensional object in the light path between the light source and lens to throw its shadow, means for rotating the holding means about an axis crossing the light path between the light source and lens, and means for simultaneously illuminating the front of the rotating object.

12. Light projection display apparatus comprising a front lens, a filamentary source of light to the rear of the lens, means for holding an object in the light path between the light source and lens to throw its shadow, means for simultaneously illuminating the front of the object, and means for progressively and cooperatively moving the object and the filamentary light source during projection.

13. Light projection display apparatus comprising a front lens, a source of light to the rear of the lens, means for holding an object representing a scene in three dimensions in the light path between the light source and lens to throw its shadow, means for simultaneously illuminating the front of the scene, and means for progressively rotating the holding means and thereby rotating the scene in the light path during projection.

14. Light projection display apparatus comprising a front lens, a source of light to the rear of the lens, means for supporting an object representing a scene in the light path between the light source and lens to throw its shadow, means for simultaneously illuminating the front of the object by light of a different color from the light projected from the rear of the object, and means for progressively moving the object during projection.

15. Light projection display apparatus comprising a front lens, a source of light to the rear of the lens, means for supporting an object in the light path between the light source and lens to throw its shadow, means for simultaneously illuminating the front of the object, means for progressively moving the object during projection, and means for varying the relative intensity of the rear source of light and the front illuminating means during projection.

16. Light projection display apparatus comprising a front lens, a source of light to the rear of the lens, means for supporting an object in the light path between the light source and lens to throw its shadow, means for simultaneously illuminating the front of the object, means for progressively moving the object during projection, and a patterned screen interposed in the light path between the light source and object, having means for moving it during projection.

17. Light projection display apparatus comprising a plurality of projection means arranged to superpose simultaneous and mutually modifying effects upon a curtain; one means comprising an internal reflector of tubular form with a filamentary source of light behind it arranged and movable for the lensless projection of representations of its filaments on the curtain, and the other a lens with a filamentary source of light behind it arranged and movable for the projection of moving images of its filaments on the curtain, and means for differently coloring the superposed projections.

18. Light projection display apparatus comprising a front lens, a holder behind the lens for a three dimension object to be silhouetted, means for progressively rotating said holder during projection, a filamentary source of illumination to the rear of the holder, and means for progressively shifting said source during projection, in combination with a timing mechanism and connections controlled therefrom for giving predetermined cooperative movements to said holder and source of illumination.

19. Light projection display apparatus comprising a tiltable lens, means for progressively changing the tilt of the lens during projection, a holder behind the lens for a three dimension object to be silhouetted, means for progressively rotating said holder during projection, a source of illumination to the rear of the holder, in combination with a timing mechanism and connections controlled therefrom for giving predetermined cooperative movements to said lens tilting means and said holder.

20. Apparatus as in claim 18 and wherein is means controlled by said timing mechanism for varying the intensity of light.

21. Apparatus as in claim 18 and wherein is a color screen moved progressively in the path of light by control of said timing mechanism.

22. Apparatus as in claim 11 and wherein is means for progressively moving the supporting means and object during projection, means for changing the relative intensity of the rear light and front illumination, timing mechanism, and means controlled thereby for giving predetermined actions to said object moving means and said intensity changing means.

23. A lensless light projection display apparatus, comprising a filamentary light source, and adjacently in front of the light source an internal reflector of hollow form arranged to enclose the beam of light rays passing from the light source to the curtain and to deflect part of such rays to the curtain, and means for effecting progressive relative movement between the filamentary light source and the internal reflector during projection, whereby a changing projected effect is afforded.

24. Apparatus as in claim 23 and wherein the reflector surface is substantially cylindrical but with portions departing from a true cylinder, and the filament is progressively moved about an axis other than the axis of the light path.

25. Light projection display apparatus comprising a filamentary light source, and adjacently in front of it an internal reflector of hollow form arranged to enclose the light beam between the light source and curtain, and to modify the beam of light and thence deliver it without subsequent distortion to the curtain, and means for effecting bodily movement of the filamentary light source during projection.

26. Apparatus as in claim 25 and wherein the internal reflector is of tubular form, adapted to pass the center of the beam without deflection but to deflect the outer light rays to the curtain.

27. Apparatus as in claim 25 and wherein the reflector is tubular, with departures from circular cross section, and has means for rotating it during projection.

28. Light projection display apparatus comprising a filamentary light source, and adjacently in front of the light source an internal reflector of hollow form arranged to enclose the light path at a point in front of the light source and arranged to deliver direct to the curtain, and means for bodily moving the filamentary light source relatively to the axis during projection.

In testimony whereof, I have affixed my signature hereto.

THOMAS WILFRED.